(12) United States Patent
Estes

(10) Patent No.: US 8,862,556 B2
(45) Date of Patent: Oct. 14, 2014

(54) DIFFERENCE ANALYSIS IN FILE SUB-REGIONS

(75) Inventor: Philip F Estes, Palmyra, VA (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 13/537,601

(22) Filed: Jun. 29, 2012

(65) Prior Publication Data

US 2014/0006461 A1     Jan. 2, 2014

(51) Int. Cl.
*G06F 17/30*   (2006.01)

(52) U.S. Cl.
USPC ........... 707/687; 707/688; 707/696; 707/707; 707/737; 707/821

(58) Field of Classification Search
USPC ................................................. 707/687, 821
See application file for complete search history.

(56) References Cited

U.S. PATENT DOCUMENTS

2011/0246968 A1*  10/2011  Zhang et al. .................. 717/125

OTHER PUBLICATIONS

Wang et al. (X-Diff: An Effective Change Detection Algorithm for XML Documents; Data Engineering, 2003).*
IBM, IPC0m000178880D, Inra-document diff tool to identify and compare cut- and pasted text, Jan. 28, 2009.
Softoxi.com Editor Team, Smart Code Diff, you are looking for . . . , Compare++, retrieved Jun. 27, 2012.
Stackoverflow, http://web.archive.org/web/20100725150432/http://stackoverflow.com/q . . . , Best Diff Tool?, retrieved Jun. 28, 2012.

* cited by examiner

*Primary Examiner* — Sana Al Hashemi
(74) *Attorney, Agent, or Firm* — Kunzler Law Group; Steven L. Bennett

(57) ABSTRACT

A method for difference analysis in file sub-regions includes determining a start location in each of a first file and a second file. The start location is defined from a start indicator. The method includes determining a stop location in each of the first file and the second file. The stop location is defined from a stop indicator. The method includes defining a first difference region in the first file and a second difference region in the second file. The first and second difference regions include portions of the first and second files respectively. The portions are between the start location and the stop location in the first and second files. The method includes performing a difference analysis between the first difference region and the second difference region, including identifying differences between the first difference region of the first file and the second difference region of the second file.

20 Claims, 8 Drawing Sheets

205

```
public class Animation { public static void main(String args[]) {

Display display;

Animation test = new Animation();
    test.run(display);
  }
        500a        215a              225a
  public void loadImages() {

Image image1 = loadImage("images/image1.jpg");
    Image image2 = loadImage("images/image2.jpg");

}
    505a      220a
  public void run(Display display) {
    screen = new SimpleScreenManager();
    try {
      screen.setFullScreen(display, new JFrame());
      loadImages();
      animationLoop();
    } finally {
      screen.restoreScreen();
    }
  }
}
```

210

```
public class Animation { public static void main(String args[]) {

Display display;

Animation test = new Animation();
    test.run(display);
  }
        500b        215b              225b
  public void loadImages() {

Image image1 = loadImage("images/image1.jpg");
    Image image2 = loadImage("images/image2.jpg");
    Image image3 = loadImage("images/image3.jpg");
    Image image4 = loadImage("images/image4.jpg");
  }
    505b      220b
  public void run(Display display) {
    screen = new SimpleScreenManager();
    try {
      screen.setFullScreen(display, new JFrame());
      loadImages();
      animationLoop();
    } finally {
      screen.restoreScreen();
    }
  }
}
```

```
public void loadImages() {

Image image1 = loadImage("images/image1.jpg");
  Image image2 = loadImage("images/image2.jpg");
  Image image3 = loadImage("images/image3.jpg");
  Image image4 = loadImage("images/image4.jpg");
}
```
— 515

FIG. 5B

DIFFERENCE ANALYSIS IN FILE SUB-REGIONS

FIELD

The subject matter disclosed herein relates to difference analysis and more particularly to difference analysis in file sub-regions.

BACKGROUND

Description of the Related Art

Often, a user may wish to view differences between text in files, such as software source code files, legal documents, business documents, and the like. For example, a software developer may wish to view changes made by other software developers, or a business person may want to compare an older version of a business plan with a newer version.

Typically, differencing tools return differencing results as entire files or groups of files. In many instances, the number and length of files are such that a user may sift through a large amount of data in viewing the differences between various file versions. In certain instances, a user may wish to view differences between portions of files instead of entire files. To achieve this, a user often has to manually locate the desired portions, which may be especially cumbersome with large codebases or lengthy files.

BRIEF SUMMARY

A method for difference analysis in file sub-regions includes, in one embodiment, determining a start location in each of a first file and a second file. The start location may be defined from a start indicator. In one embodiment, the method includes determining a stop location in each of the first file and the second file. The stop location may be defined from a stop indicator. In one embodiment, the method includes defining a first difference region in the first file and a second difference region in the second file. The first and second difference regions may include portions of the first and second files respectively. The portions may be between the start location and the stop location in each of the first file and the second file. In one embodiment, the method includes performing a difference analysis between the first difference region and the second difference region. The difference analysis may include identifying differences between the first difference region of the first file and the second difference region of the second file.

In one embodiment, the start indicator and/or the stop indicator include a bookmark, one or more keywords, one or more function names, one or more object names, one or more Extended Markup Language (XML) tags, one or more section names, and/or one or more regular expressions.

In one embodiment, determining the start location in each of the first file and the second file further includes searching each of the first file and the second file for a particular location in each of the first file and the second file. The particular location may include the start indicator and the method may include determining that the particular location is the start location. In a further embodiment, determining the stop location in each of the first file and the second file further includes searching each of the first file and the second file for a second particular location in each of the first file and the second file. The second particular location may include the stop indicator and the method may further include determining that the second particular location is the stop location.

In one embodiment, the start location and/or the stop location include one or more of a beginning and an ending of a section including an occurrence of the start indicator and/or the stop indicator. The section may include a portion of the first file and/or the second file. In a further embodiment, the section includes a paragraph, a chapter, a function, a tree, a branch, a class, an inline comment, a block comment, and/or an object.

In one embodiment, the first difference region and/or the second difference region include at least a portion of a function, an object, a section, a chapter, and/or an Extended Markup Language (XML) tree. In another embodiment, the start indicator and/or the stop indicator include one or more keywords. The start location and/or the stop location are positioned within a predetermined distance of an occurrence of the one or more keywords in the first file and/or the second file.

In one embodiment, the start indicator and/or the stop indicator specify a plurality of keywords and one or more threshold distances between individual words of the plurality of keywords. In certain embodiments, the start indicator and/or the stop indicator specify a plurality of keywords. In a further embodiment, determining a start location and determining a stop location includes determining a keyword score for a section of the first file and/or the second file. The keyword score may be based on a number of words in the section matching keywords of the plurality of keywords. In a further embodiment, determining the start location and determining the stop location includes determining that the keyword score meets a threshold and assigning a beginning of the section as the start location and assigning an end of the section as the stop location in response to determining that the keyword score meets the threshold.

In one embodiment, the method includes displaying the first difference region and/or the second difference region prior to performing the difference analysis. In another embodiment, the method includes adjusting a size of the first difference region and/or the second difference region in response to external input. In another embodiment, the method includes outputting a difference result. The difference result may indicate the differences between the first difference region and the second difference region.

An apparatus for difference analysis in file sub-regions includes, in one embodiment, a start determination module that determines a start location in each of a first file and a second file. The start location may be defined from a start indicator. In one embodiment, the apparatus includes a stop determination module that determines a stop location in each of the first file and the second file. The stop location may be defined from a stop indicator. In one embodiment, the apparatus includes a difference region module that defines a first difference region in the first file and a second difference region in the second file. The first and second difference regions may include portions of the first and second files respectively. The portions may be between the start location and the stop location in each of the first file and the second file. In one embodiment, the apparatus includes a difference analysis module that performs a difference analysis between the first difference region and the second difference region. The difference analysis may include identifying differences between the first difference region of the first file and the second difference region of the second file.

In one embodiment, the apparatus includes a server executing the start determination module, the stop determination module, the difference region module, and the difference analysis module. The server may include a processor and a memory. In another embodiment, the start indicator and/or the stop indicator include a bookmark, one or more keywords, one or more function names, one or more object names, one or more Extended Markup Language (XML) tags, one or more section names, and/or one or more regular expressions. In another embodiment, the apparatus includes an output module that outputs a difference result. The difference result may indicate differences between the first difference region and the second difference region.

A computer program product comprising a computer readable storage medium having computer readable program code embodied therewith for difference analysis in file sub-regions includes, in one embodiment, determining a start location in each of a first file and a second file. The start location may be defined from a start indicator. In one embodiment, the computer program product includes determining a stop location in each of the first file and the second file. The stop location may be defined from a stop indicator. In one embodiment, the computer program product includes defining a first difference region in the first file and a second difference region in the second file. The first and second difference regions may include portions of the first and second files respectively. The portions may be between the start location and the stop location in each of the first file and the second file. In one embodiment, the computer program product includes performing a difference analysis between the first difference region and the second difference region. The difference analysis may include identifying differences between the first difference region of the first file and the second difference region of the second file.

In one embodiment, determining the start location in each of the first file and the second file includes searching each of the first file and the second file for a particular location in each of the first file and the second file. The particular location may include the start indicator. In a further embodiment, the computer program product includes determining that the particular location is the start location and determining the stop location in each of the first file and the second file includes searching each of the first file and the second file for a second particular location in each of the first file and the second file. The second particular location may include the stop indicator and the computer program product may include determining that the second particular location is the stop location. In one embodiment, the computer program product includes displaying the first difference region and/or the second difference region prior to performing the difference analysis.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5A is a schematic block diagram illustrating one embodiment of first and second difference regions in accordance with the present invention;

FIG. 5B is a schematic block diagram illustrating one embodiment of a difference result in accordance with the present invention;

DETAILED DESCRIPTION OF THE INVENTION

Figure 1:
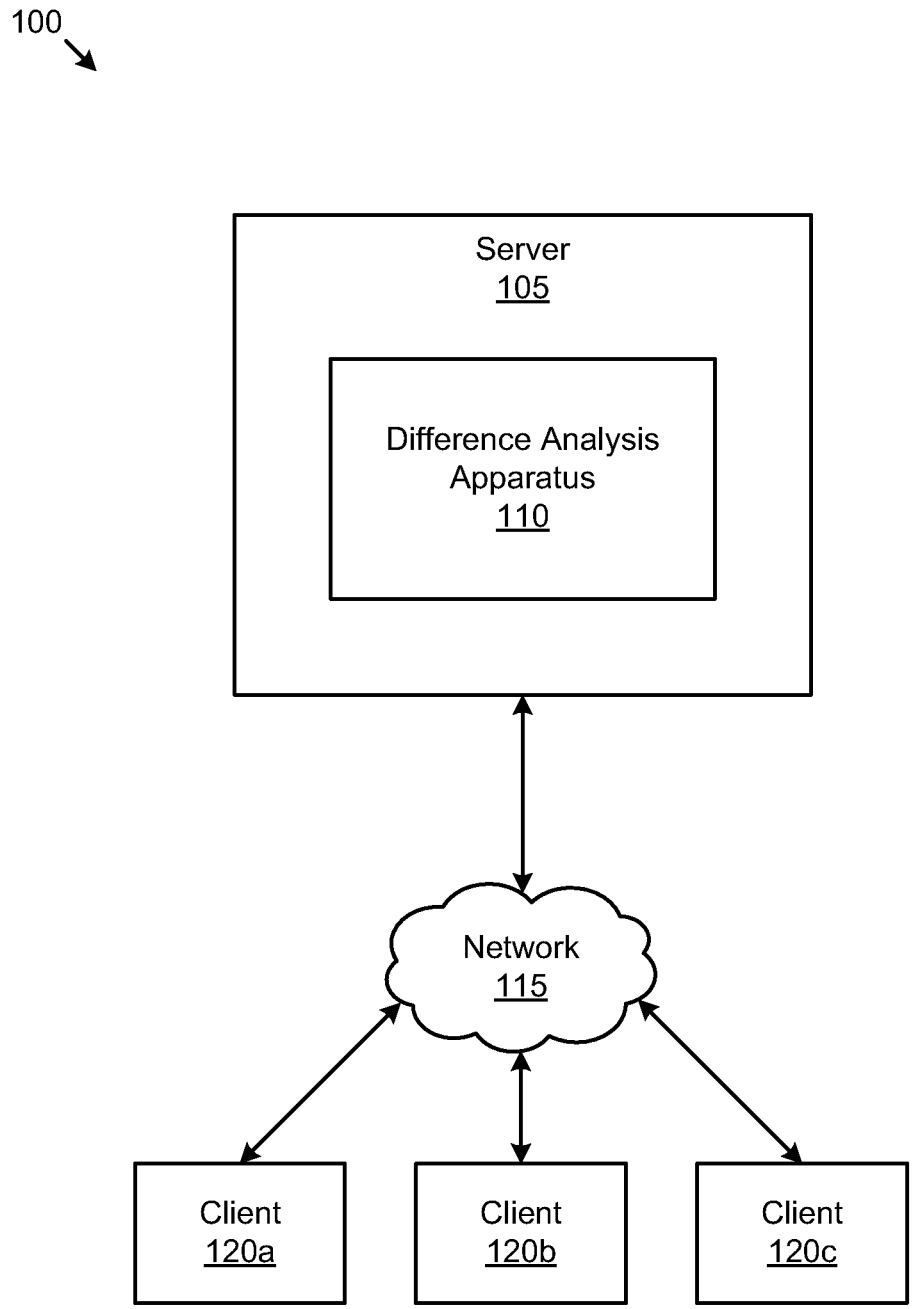
FIG. 1 is a schematic block diagram illustrating one embodiment of a system for difference analysis in file sub-regions in accordance with the present invention.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a system 100 for difference analysis in file sub-regions. In the depicted embodiment, the system 100 includes a server 105 with a difference analysis apparatus 110. Typically, conventional differencing tools return differencing results as entire files, often presenting a user with vast amounts of data. In many instances, the number and length of files are such that a user may sift through this vast amount of data in viewing differences between file versions. In certain instances, a user may wish to view differences between particular functions, particular methods, portions of files having certain keywords, or the like. For example, a user may have a particular section of a file in mind that the user wishes to view the differences among file versions. The user may remember that the particular section is close to certain keywords or phrases, but may not have the time or desire to manually sift through the files to find these sections.

Specifically, with conventional differencing tools, if a user desires to only examine differences in portions of files, a user often has to manually locate the desired portions, which may be especially cumbersome with large codebases or lengthy files. The difference analysis apparatus 110 defines regions in files in which to perform a difference analysis. As used herein, a difference analysis detects, identifies, and/or indicates differences between files. A difference analysis may identify portions of files that differ in content, text, and the like. The difference analysis apparatus 110 may receive start and stop indicators, such as keywords, regular expressions, or the like, from the user, and may define difference regions in files selected for differencing based on the start and stop indicators. The difference analysis may be limited to these difference regions, allowing the user to focus on desired file portions using the start and stop indicators and sparing the user from having to locate the desired file portions in each file compared by the difference analysis.

The difference analysis apparatus 110 may be part of a server 105 as depicted, accessible by a client 120a through a network 115 or may be installed on or accessible by a computing device, such as a desktop computer, workstation, laptop computer, tablet computer, a mobile computing device such as a cellular phone or smartphone, or any other computing device. The server 105 may be part of a cloud computing environment accessible by a client 120a. One of skill in the art will recognize other ways of implementing the difference analysis apparatus 110 for access using a computing device.

In one embodiment, the difference analysis apparatus 110 includes, is part of, and/or is included in another application, such as a word processing application, a software coding application, an integrated development environment (IDE), a differencing application, or the like. For example, the difference analysis apparatus 110 may be embodied as a plug-in to an IDE allowing a user of the IDE to compare differences in portions of code files.

The server 105 may include a processor and a memory that stores computer readable programs. The memory may be embodied by volatile memory such as dynamic random access memory ("DRAM"), static random access memory ("SRAM"), or other suitable volatile memory. The processor executes the computer readable programs as is well known to those skilled in the art. The computer readable programs may be tangibly stored in storage in the server 105. The storage may include a Solid State Drive ("SSD"), a hard disk drive ("HDD"), an optical storage device, a holographic storage device, a micromechanical storage device, or other non-volatile data storage device. The server 105 may be embodied by a server computer, a desktop computer, a laptop computer, a tablet computer, a mobile device, or another computing device. The server 105 is in communication with one or more clients 120a, 120b, 120c, through a network 115.

The network 115 may include a communications network such as the Internet, a Local Area Network ("LAN"), a Wireless LAN ("WLAN"), multiple LANs communicating over the Internet, or any other similar communications network. The network 115 may include hardware such as the server 105, routers, switches, cabling, and other communication hardware. Each client 120a, 120b, 120c communicates with the server 105 through the network 115. A client 120a may be embodied as a desktop computer, a portable computer, a server, a mainframe computer, a handheld computing device, a touch device, a PDA, a tablet computer, an e-Book reader, a mobile phone, a Smartphone, and the like. In one embodiment, a client 120a may access the difference analysis apparatus 110 over the network.

Figure 2:
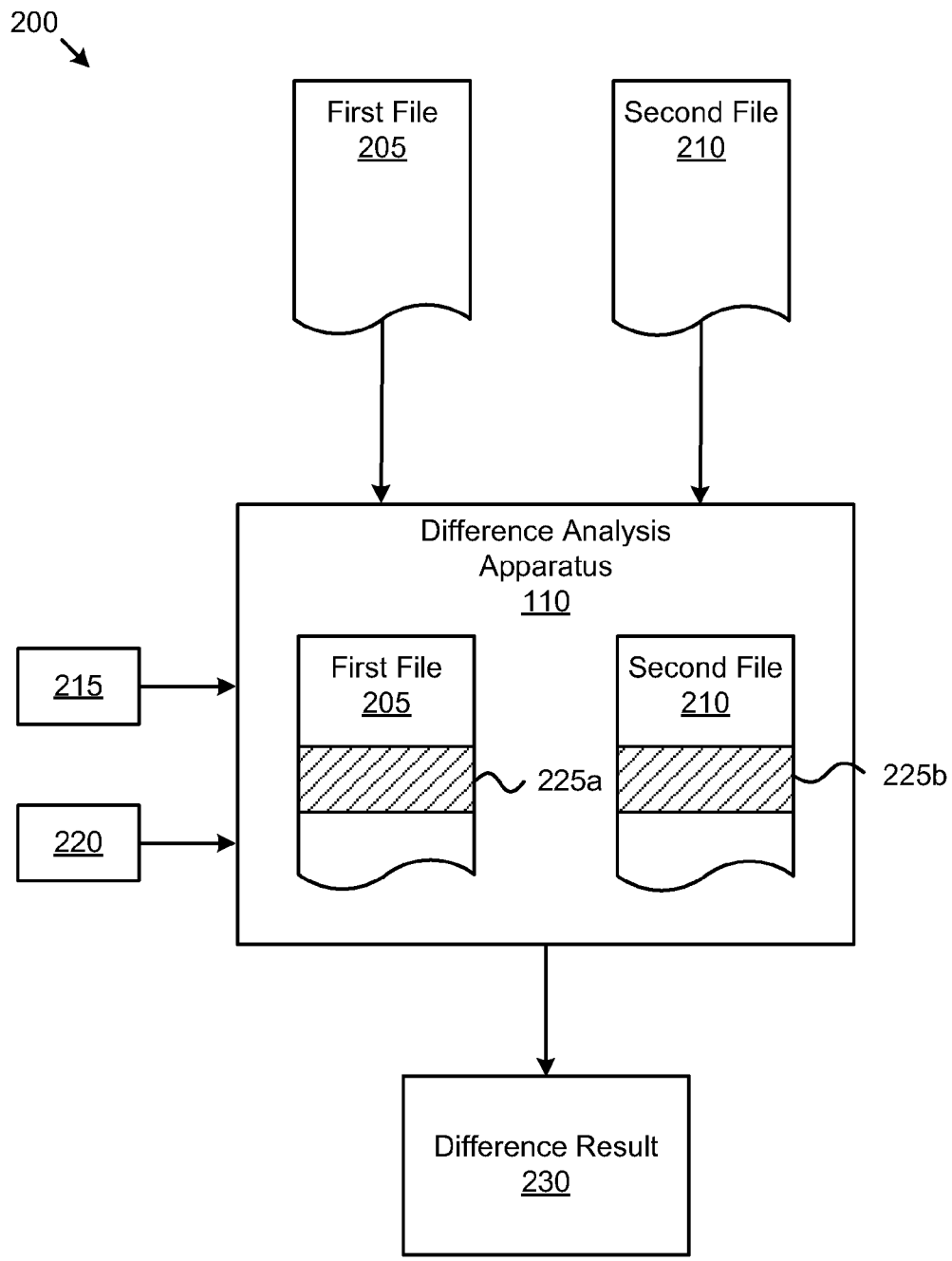
FIG. 2 is a schematic block diagram illustrating one embodiment of file input for difference analysis in file sub-regions in accordance with the present invention.

FIG. 2 is a schematic block diagram illustrating one embodiment of file input for difference analysis in file sub-regions. FIG. 2 depicts a first file 205 and a second file 210 and a start indicator 215 and a stop indicator 220 that are input into the difference analysis apparatus 110. A file may comprise an electronic file or document. In one embodiment, the file may comprise any electronic file that includes text. The file may be a text file, a word processing file, a spreadsheet file, a source code file such as a JAVA file, or the like. In another embodiment, the difference analysis apparatus 110 prompts a user to select one or more files for the difference analysis. For example, the difference analysis apparatus 110 may allow a user to navigate to files in a file system interface, to select a certain folder containing files, to input files, or the like. The difference analysis apparatus 110 may also allow a user or application to enter the start and stop indicators 215, 220 as text input or the like.

The difference analysis apparatus 110 determines difference regions 225a, 225b in the first file 205 and the second file 210 using the start indicator 215 and the stop indicator 220 and performs a difference analysis by identifying differences between the difference regions 225a, 225b, which are portions of the first and second files 205, 210 respectively. The start indicator 215, in one embodiment, specifies, defines, provides a basis for, and/or indicates a particular location in the first and second files 205, 210. The start indicator 215 may serve to identify a start location in the first and second files 205, 210. The start location may define a boundary to the difference region 225a at the beginning of the difference region 225a. The start indicator 215 may include a condition, a keyword, a function name, a chapter, or the like.

The stop indicator 220, in one embodiment, specifies, defines, provides a basis for, and/or indicates a second particular location in the first and second files 205, 210. The stop indicator 220 may serve to identify a stop location in the first and second files 205, 210. The stop location may define a second boundary to the difference region 225a set at the ending of the difference region 225a. The stop indicator 220, like the start indicator 215, may include a condition, a keyword, a function name, a chapter, or the like. The difference analysis apparatus 110, in another embodiment, defines the difference region 225a using the start and stop indicators 215, 220, for example, as a portion of the first or second files 205, 210 between the start and stop locations as described below. In certain embodiments, the difference analysis apparatus 110 defines a difference region 225a using keyword scoring of particular sections of the first and second files 205, 210. Although the depicted embodiment includes two files, the difference analysis apparatus 110, in certain embodiments, may input more than two files and perform the difference analysis between difference regions 225a, 225b in each input file.

The difference analysis apparatus 110 outputs a difference result 230 indicating differences between the first difference region 225a and the second difference region 225b. The difference result 230 may indicate differences between difference regions 225a, 225b by showing textual variations in a marked up form, highlighted form, or the like. The difference result 230 may include a version of the first file 205 or the second file 210 showing differences in a marked up form. In one embodiment, the difference result 230 includes text content in just the difference region 225a. The difference result 230 may be embodied as a text document or other suitable format.

Figure 3:
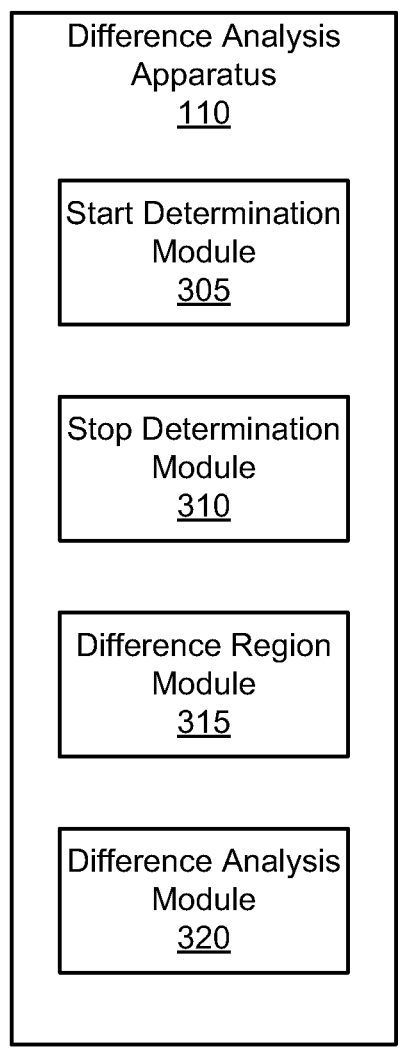
FIG. 3 is a schematic block diagram illustrating one embodiment of an apparatus for difference analysis in file sub-regions in accordance with the present invention.

FIG. 3 is a schematic block diagram illustrating one embodiment of an apparatus 300 for difference analysis in file sub-regions. In another embodiment, the apparatus 300 includes the difference analysis apparatus 110 with a start determination module 305, a stop determination module 310, a difference region module 315, and a difference analysis module 320, which are described below.

The start determination module 305, in one embodiment, determines a start location in one or more files. The one or more files may be files selected, by a user or an application, for comparison using difference analysis. In another embodiment, selected files are files in which the start determination module 305 locates a start indicator and/or in which the stop determination module 310 (as described below) locates a stop indicator. In another embodiment, the selected files may be part of a large codebase searched for instances of a start or stop indicator as described below. For example, in another embodiment, the start determination module 305 may search multiple files for instances of the start indicator. The start determination module 305 may locate an instance of the start indicator in a particular file and select the particular file for comparison.

In one embodiment, the start location is a particular location in a file that serves to define a boundary in the file. In another embodiment, the start location defines the boundary of a difference region in a file, specifically, the beginning of the difference region. A difference region, in one embodiment, is a portion, a subset, and/or a sub-region of a file. The difference analysis between selected files may be limited to the difference regions within those files. In another embodiment, the start determination module 305 determines a start location in one or more selected files. For example, the start determination module 305 may determine a start location in a first file and determines a start location in one or more second files that are to be compared to the first file and/or to one another as part of the difference analysis. The start determination module 305 may store and/or reference the start location in each file using reference points in each file, such as a line and character number (e.g. character 7 of line 55).

The start location, in one embodiment, is defined by the start determination module 305 from a start indicator. As described above, the start indicator may specify, define, provide a basis for, and/or indicate a start location in each selected file. In another embodiment, the start determination module 305 determines the start location in the selected files by searching the selected files for a particular location in each selected file. The particular location may include the start indicator and/or may be indicated by the start indicator. The start determination module 305 may determine that the particular location is the start location.

In one embodiment, the start indicator comprises a bookmark. For example, the bookmark may directly indicate a particular starting location in a file (such as by using row and column numbers, line and character numbers, page and paragraph numbers, or the like). In another embodiment, the start indicator includes one or more keywords, one or more function names, one or more object names, one or more Extended Markup Language (XML) tags, one or more section names, one or more regular expressions, and/or the like. For example, in another embodiment, the start indicator is a keyword and the start determination module 305 may determine the start location in response to locating an occurrence of the keyword in a file. The start indicator may be a beginning of a highlighted section of text in the selected files.

In an embodiment in which the start indicator includes one or more keywords, the start determination module 305 may position the start location within a predetermined distance of an occurrence of the one or more keywords in each selected files. For example, if a first file and a second file are selected for comparison and the start indicator is the keyword "render," in one embodiment, the start determination module 305 positions the start location within each of the first file and the second file within a predetermined distance of an occurrence of the keyword "render." In another embodiment, the start indicator specifies a plurality of keywords and one or more threshold distances between individual words of the plurality of keywords. For example, the start indicator may include the words "render" and "circle" within five words of each other and the start determination module 305 may determine the start location in the selected files upon locating an occurrence of the keywords and the threshold distance.

In one embodiment, the start location includes a beginning and or ending of a section with an occurrence of the start indicator. The section may include a portion of one or more selected files. For example, the start determination module 305 may locate an occurrence of the start indicator in a particular section of a first file and the start determination module 305 may position the start location at the beginning of the particular section. In another embodiment, the section is a paragraph, a chapter, a function, a tree, a branch, a class, an inline comment, a block comment, or an object.

The stop determination module 310, in one embodiment, determines a stop location in one or more selected files. The stop determination module 310 may search multiple files for instances of the stop indicator and/or may search files selected by the start determination module 305 (e.g. files in which the start determination module 305 located a start indicator).

Like the start location, the stop location, in one embodiment, is a particular location in a file that serves to define a boundary in the file. The stop location may define the boundary of a difference region in a file, specifically, the end of the difference region. In one embodiment, the stop determination module 310 determines a stop location in each selected file. For example, in one embodiment, the stop determination module 310 determines a stop location in a first file and determines a stop location in one or more second files that are to be compared to the first file and/or to one another as part of the difference analysis. In one embodiment, the stop determination module 310 determines a stop location in a particular file in which the start determination module 305 determined a start location. The start determination module 305 may store and/or reference the start location in each file using reference points in each file, such as a line and character number (e.g. character 7 of line 55).

The stop location, in another embodiment, is defined from a stop indicator. Like the start indicator for the start location, the stop indicator specifies, defines, provides a basis for, and/or indicates a stop location in each selected file. In another embodiment, the stop determination module 310 determines the stop location in selected files by searching each of the selected files for a particular location in the selected files that includes the stop indicator. In another embodiment, the stop determination module 310 determines that the particular location is the stop location.

In certain embodiments, the stop indicator may be similar in form to the start indicator 215. The stop indicator may include a bookmark as described above in relation to the start indicator, one or more keywords, one or more function names, one or more object names, one or more Extended Markup Language (XML) tags, one or more section names, one or more regular expressions, or the like. In another embodiment, the stop indicator may be an ending of a highlighted portion of text in the selected files.

In an embodiment in which the stop indicator includes one or more keywords, the stop determination module 310 may position the stop location within a predetermined distance of an occurrence of the one or more keywords in each selected file. For example, if a first file and a second file are selected for comparison and the stop indicator is the keyword "render," in one embodiment, the stop determination module 310 positions the stop location within each of the first file and the second file within a predetermined distance of an occurrence of the keyword "render." In another embodiment, the stop indicator specifies a plurality of keywords and one or more threshold distances between individual words of the plurality of keywords. For example, in another embodiment, the stop indicator may include the words "render" and "circle" within five words of each other and the stop determination module 310 may determine the stop location in the selected files upon locating an occurrence of the keywords and the threshold distance.

In one embodiment, the stop location includes a beginning and or ending of a section with an occurrence of the stop indicator. The section may include a portion of one or more selected files. For example, the stop determination module 310 may locate an occurrence of the stop indicator in a particular section of a first file and the stop determination module 310 may position the stop location at the ending of the particular section. In another embodiment, the section is a paragraph, a chapter, a function, a tree, a branch, a class (e.g. a software class), an inline comment, a block comment, a method, an object (e.g. a software code object), or the like.

In one embodiment, the start indicator is different, distinct, and/or separate from the stop indicator. In certain embodiments, the start indicator and the stop indicator may include common keywords as is described below. In another embodiment, the stop indicator is based on the start indicator. For example, if a start indicator includes a particular method (e.g. public void loadImages), the stop indicator may include a marker that ends the method (e.g. a closing bracket corresponding to the method) as a stop indicator.

The difference region module 315, in one embodiment, defines difference regions in selected files. For example, if a first and second files are being compared, the difference region module 315 may define a first difference region in a first file and a second difference region in a second file. The first and second difference regions may include portions of the first and second files respectively. In another embodiment, a particular portion making up a difference regions may be between the start location and the stop location in each selected file.

Difference regions may include portions of file sections or may include entire file sections. In one embodiment, the first difference region and/or the second difference region includes at least a portion of a function, an object, a section, a chapter, or an Extended Markup Language (XML) tree. For example, a difference region may include a particular chapter of a novel, a particular method or function in software code, a particular XML tree, or the like. In one embodiment, a difference region is defines based on a highlighted portion in the selected files. For example, a user may highlight a certain portion of the selected files and the difference region module 315 may base the difference region on the highlighted portion. A user may wish to compare differences for a certain method or software object. The difference region may, alternatively, include a portion of a novel, a particular method or function, a branch of an XML tree, or the like. For example, the user may wish to compare differences for certain portions of a function or method.

In one embodiment, the difference region module 315 determines and stores information about a difference region. The difference region module 315 may store a location of a difference region, a length of the difference region, and/or the like in the form of metadata about the difference region. The metadata may include line numbers, functions, methods, sections identifiers, or the like defining the difference region. For example, if the difference region module 315 has determined a difference region in file 1 and a corresponding difference region in file 2, the difference region module may determine and store that the difference region in file 1 is defined by lines 250-264 and the difference region in file 2 is defined by lines 252-266.

Furthermore, in some embodiments, the difference region module 315 defines a single difference region in each file. In other embodiments, the difference region module 315 defines multiple difference regions in each file.

The difference analysis module 320, in one embodiment, performs a difference analysis between difference regions of selected files. For example, if the selected files are first and second files with first and second difference regions respectively, the difference analysis module 320 may perform the difference analysis between the first difference region and the second difference region. The difference analysis may include identifying differences between the difference regions. In another embodiment, the difference analysis module 320 may output the identified differences between the difference regions in a difference result as described above. The difference analysis module 320 may perform the difference analysis for multiple difference regions in each of the selected files. For example, the difference analysis module 320 may perform a first difference analysis for a difference region in a first file and a corresponding difference region in a second file and the difference analysis module 320 may perform a second difference analysis for a another difference region in the first file and a corresponding difference region in the second file.

Figure 4:
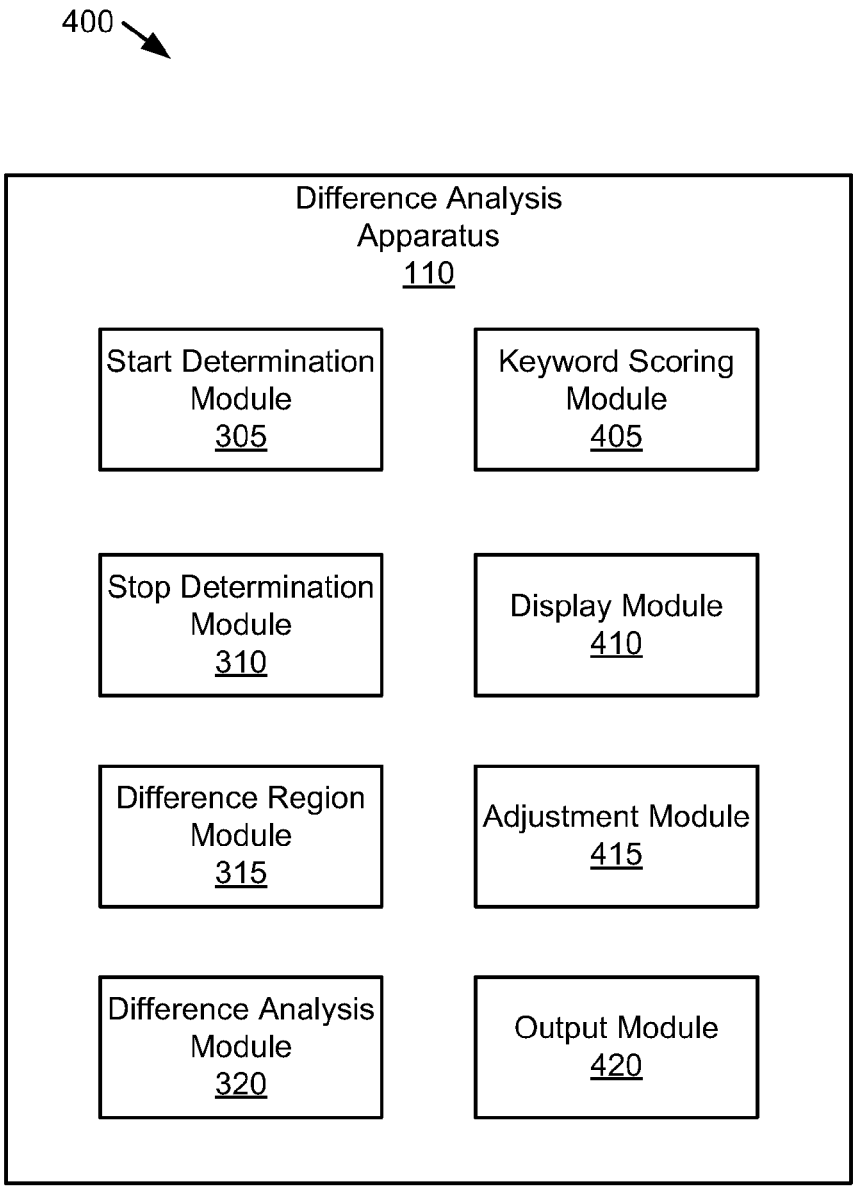
FIG. 4 is a schematic block diagram illustrating another embodiment of an apparatus for difference analysis in file sub-regions in accordance with the present invention.

FIG. 4 is a schematic block diagram illustrating another embodiment of an apparatus for difference analysis in file sub-regions. The apparatus 300 includes an embodiment of a difference analysis apparatus 110 with a start determination module 305, a stop determination module 310, a difference region module 315, and a difference analysis module 320, which are substantially similar to those described in relation to the apparatus 300 of FIG. 3. In addition, the embodiment of the difference analysis apparatus 110 may include one or more of a keyword scoring module 405, a display module 410, an adjustment module 415, and an output module 420, which are described below.

The keyword scoring module 405, in one embodiment, determines start and stop positions based on keyword scores. In one embodiment, the start indicator and/or the stop indicator specify a plurality of keywords. Specifically, the start indicator and the stop indicator may include a list of keywords. In another embodiment, the keyword scoring module 405 determines a keyword score for a section of the selected files based on a number of words in the section matching keywords of the plurality of keywords. For example, a user may wish to compare sections involve certain legal terms and may input the keywords "copyright," "rights," and "infringement" as the start and stop indicators. The keyword scoring module 405 may search through sections of selected files, determining a keyword score for each section based on the number of words in the section that match the keywords, the number of occurrences of each word that matches a keyword, and/or a distance between each occurrence of a word that matches a keyword. Each section may include a paragraph, a chapter, a function, a tree, a branch, a class, an inline comment, a block comment, an object, a predetermined number of lines, or the like.

In one embodiment, the keyword scoring module 405 determines whether the keyword score meets a threshold (e.g. a minimum score). The keyword scoring module 405 may assign a beginning of a particular section as the start location and assign an end of the particular section as the stop location in response to determining that the keyword score meets the threshold. For example, if the threshold is five occurrences of the keywords and the keyword scoring module 405 determines that a particular paragraph includes six occurrences of the keywords, the keyword scoring module 405 may assign the beginning of the paragraph as the start location and the end of the paragraph as the stop location.

In one embodiment, the keyword scoring module 405 searches through selected files, section by section, evaluating each section with keyword scoring. The keyword scoring module 405, in another embodiment, may determine a plurality of difference regions for each selected file. In certain embodiments, the keyword scoring module 405 is part of and/or in communication with the start determination module 305 and/or the stop determination module 310 to determine start and stop locations.

The display module 410, in one embodiment, displays one or more difference regions prior to performing the difference analysis module 320 performing the difference analysis. For example, the display module 410 may display a difference region to a user such that the user may preview the difference region. The user may ascertain whether the difference region has been adequately defined. The display module 410 may display difference regions and/or cause difference regions to be displayed on an electronic display as is know in the art.

The adjustment module 415, in one embodiment, adjusts a size of a difference region in response to external input. In another embodiment, the adjustment module 415 allows a user to adjust a size of a difference region. In some embodiments, the display module 410 displays a difference region and the adjustment module 415 receives external input from a user to adjust the size of the difference region as viewed by the display module 410. The external input may include a keyword, interaction with an adjustable visual icon, or the like. For example, in another embodiment, the user may slide an adjustable visual icon to expand or contract text of the difference region. In another embodiment, the adjustment module 415 updates difference regions in second files in response to adjusting the difference region in a first file. For example, if the adjustment module 415 expands the size of a difference region in a first file to include an entire paragraph, the adjustment module 415 may expand difference regions in one or more second files to include the corresponding paragraphs.

The output module 420, in one embodiment, outputs a difference result. In another embodiment, the difference result indicates the differences between the difference regions of the selected files. As described above, the difference result may indicate differences between difference regions by showing textual variations in a marked up form, highlighted form, or the like. The output module 420 may output the difference result as a text file, as one of the selected files with the indicated differences, or other suitable format.

FIG. 5A is a schematic block diagram illustrating one embodiment of first and second difference regions. Specifically, FIG. 5A depicts a first file 205 (including software source code in the depicted embodiment), with a start indicator 215*a*. In the depicted embodiment, the start indicator 215*a* is the method "loadImages( )" although the start indicator 215*a* may also be the keyword "loadImages," the keywords "load" and "images," arriving at a similar result. The start determination module 305 determines, in the depicted embodiment, that the start location 500*a* is the beginning of the loadImages( ) method. The stop indicator 220*a*, in the depicted embodiment, is the closing bracket terminating the loadImages( ) method and the stop location 505*a* is also the closing bracket. The start location 500*a* and the stop location 505*a* define a first difference region 225*a*. Similarly in the second file 210, the start indicator 215b and the stop indicator 220b indicate a start location 500b and a stop location 505b, which define a second difference region 225b.

FIG. 5B is a schematic block diagram illustrating one embodiment of a difference result 510. The difference result 510 identifies differences between the first difference region 225a of the first file 205 and the second difference region 225b of the second file 210. As depicted, the difference result 510 indicates the lines of code 515 present in the second difference region 225b not present in the first difference region 225a.

Figure 6:
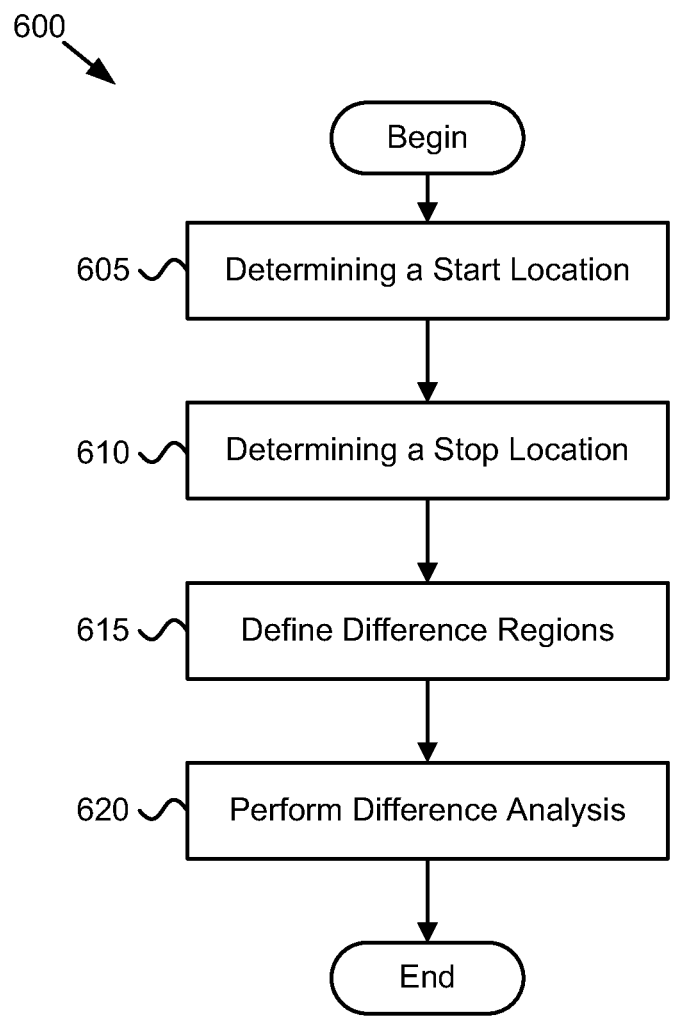
FIG. 6 is a schematic flow chart diagram illustrating one embodiment of a method for difference analysis in file sub-regions in accordance with the present invention.

FIG. 6 is a schematic flow chart diagram illustrating one embodiment of a method 600 for difference analysis in file sub-regions. The method 600 begins and the start determination module 305 determines 605 a start location in each of a first file and a second file. The first and second files may be selected and/or input from a user and/or an application. The start location may be defined from a start indicator. The stop determination module 310 determines 610 a stop location in each of the first file and the second file. The stop location may be defined from a stop indicator. The start and stop indicators may be received from a user and/or an application external from the first and second files. The difference region module 315 defines 615 a first difference region in the first file and a second difference region in the second file. The first and second difference regions include portions of the first and second files respectively. The portions may be between the start location and the stop location in each of the first file and the second file.

The difference analysis module 320 performs 620 a difference analysis between the first difference region and the second difference region. The difference analysis, in one embodiment, includes identifying differences between the first difference region of the first file and the second difference region of the second file. Then the method 600 ends.

Figure 7:
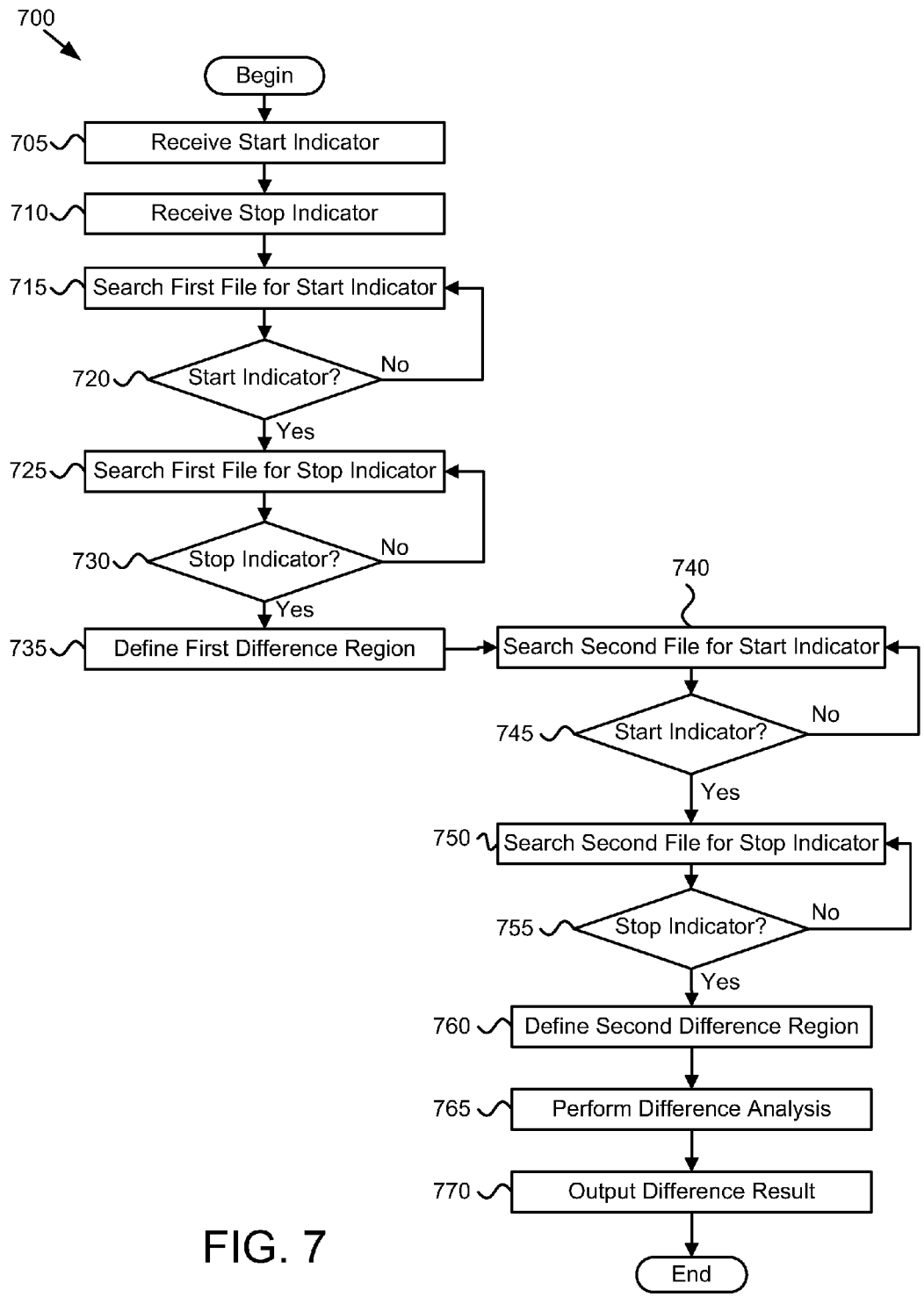
FIG. 7 is a schematic flow chart diagram illustrating another embodiment of a method for difference analysis in file sub-regions in accordance with the present invention.

FIG. 7 is a schematic flow chart diagram illustrating another embodiment of a method 700 for difference analysis in file sub-regions. The method 700 begins and the start determination module 305 receives 705 a start indicator. The stop determination module 310 receives 710 a stop indicator. The start determination module 305 searches 715 a portion of the first file for the start indicator. For example, in one embodiment, the start determination module 305 may tokenize the first file into elements of words, phrases, symbols, or the like, and the portion may be a token. The start determination module 305 determines 720 whether the portion includes the start indicator. If the portion does not 720 include the start indicator, the start determination module 305 searches 715 the next portion (e.g. the next token) of the first file.

Alternatively, if the start determination module 305 determines 720 that the portion includes the start indicator, the stop determination module 310 searches 725 a portion of the first file for the stop indicator. In one embodiment, the stop determination module 310 begins searching at a point in the first file subsequent to a location of the start indicator. The stop determination module 310 may search the first file for the stop indicator in a similar manner to the start determination module 305 searching the first file for the start indicator. If the portion does not 730 include the stop indicator, the stop determination module 310 searches 725 the next portion of the first file. If the portion includes 730 the stop indicator, the difference region module 315 defines 735 the first difference region in the first file. The first difference region may be a portion of the first file defined between the start and stop locations.

The start determination module 305 searches 740 a portion of the second file for the start indicator. In one embodiment, the start determination module 305 searches the second file for the start indicator in a similar manner to the start determination module 305 searching the first file for the start indicator. The start determination module 305 determines 745 whether the portion includes the start indicator. If the portion does not 745 include the start indicator, the start determination module 305 searches 740 the next portion of the second file.

Alternatively, if the start determination module 305 determines 745 that the portion includes the start indicator, the stop determination module 310 searches 750 a portion of the second file for the stop indicator. In one embodiment, the stop determination module 310 begins searching at a point in the first file subsequent to a location of the start indicator. The stop determination module 310 may search the second file for the stop indicator in a similar manner to the stop determination module 310 searching the first file for the stop indicator. If the portion does not 755 include the stop indicator, the stop determination module 310 searches 750 the next portion of the second file. If the portion includes 755 the stop indicator, the difference region module 315 defines 760 the second difference region in the second file. The second difference region may be a portion of the second file defined between the start and stop locations.

The difference analysis module 320 performs 765 a difference analysis between the first difference region and the second difference region to identify differences between the first difference region of the first file and the second difference region of the second file. The output module 420 outputs 770 a difference result that indicates differences between the first difference region and the second difference region. Then, the method 700 ends.

Figure 8:
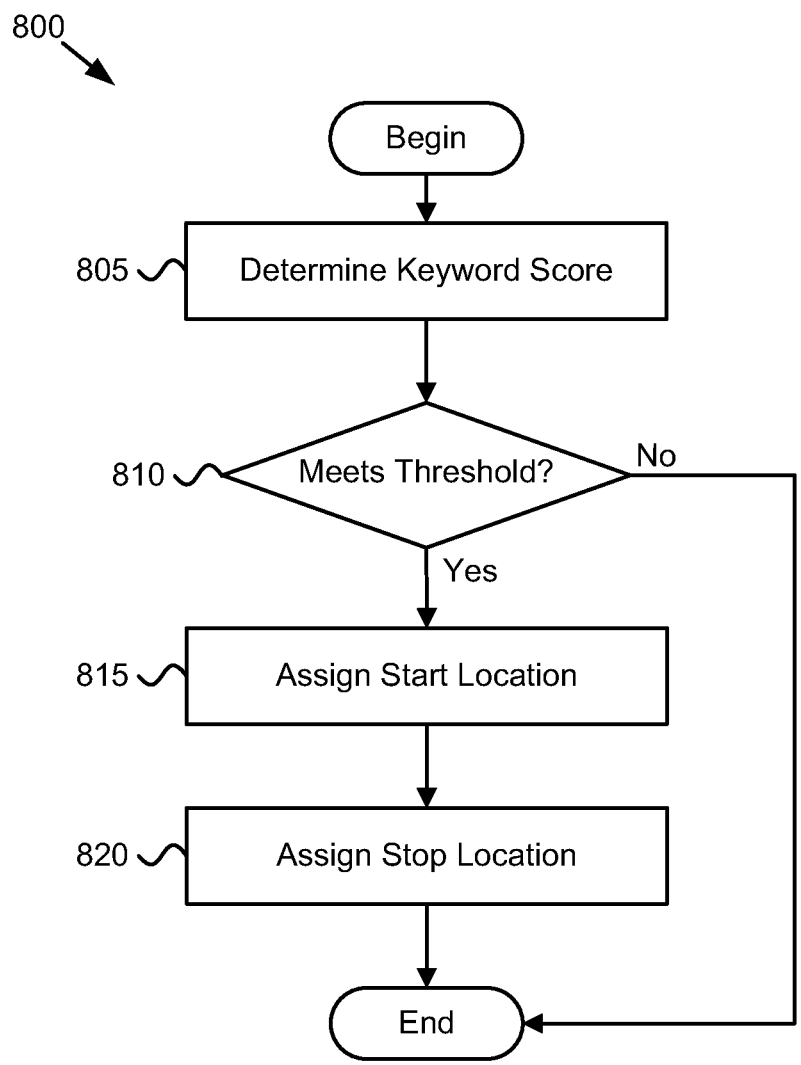
FIG. 8 is a schematic flow chart diagram illustrating one embodiment of a method for determining a difference region in accordance with the present invention.

FIG. 8 is a schematic flow chart diagram illustrating one embodiment of a method 800 for determining a difference region. The method 800 begins and the keyword scoring module 405 determines 805 a keyword score for a section of the first file 205 and/or the second file 210. The keyword score, in one embodiment, is based on a number of words in the section matching certain keywords of a plurality of keywords. The keyword scoring module 405 determines 810 whether the keyword score meets a threshold. If the keyword score for the section fails to meet 810 the threshold, the method 800 ends. Alternatively, if the keyword scoring module 405 determines 810 that the keyword score meets a threshold, the start determination module 305 assigns 815 a beginning of the section as the start location and the stop determination module 310 assigns 820 an end of the section as the stop location. Then, the method 800 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    determining a start location in each of a first file and a second file, the start location defined from a start indicator;
    determining a stop location in each of the first file and the second file, the stop location defined from a stop indicator;
    defining a first difference region in the first file and a second difference region in the second file, the first and second difference regions comprising portions of the first and second files respectively, the portions being between the start location and the stop location in each of the first file and the second file; and performing a difference analysis between the first difference region and the second difference region, the difference analysis comprising identifying differences between the first difference region of the first file and the second difference region of the second file, wherein content between the start location and stop location of each of the first file and the second file is unknown prior to performing the difference analysis.

2. The method of claim 1, wherein one or more of the start indicator and the stop indicator comprise one or more of:
a bookmark;
one or more keywords;
one or more function names;
one or more object names;
one or more Extended Markup Language (XML) tags;
one or more section names; and
one or more regular expressions.

3. The method of claim 1, wherein determining the start location in each of the first file and the second file further comprises searching each of the first file and the second file for a particular location in each of the first file and the second file, the particular location comprising the start indicator and determining that the particular location is the start location.

4. The method of claim 3, wherein determining the stop location in each of the first file and the second file further comprises searching each of the first file and the second file for a second particular location in each of the first file and the second file, the second particular location comprising the stop indicator, the method further comprising determining that the second particular location is the stop location.

5. The method of claim 1, wherein one or more of the start location and the stop location comprise one or more of a beginning and an ending of a section comprising an occurrence of one or more of the start indicator and the stop indicator, the section comprising a portion of one or more of the first file and the second file.

6. The method of claim 5, wherein the section comprises one of a paragraph, a chapter, a function, a tree, a branch, a class, an inline comment, a block comment, and an object.

7. The method of claim 1, wherein one or more of the first difference region and the second difference region comprise at least a portion of one of a function, an object, a section, a chapter, and an Extended Markup Language (XML) tree.

8. The method of claim 1, wherein one or more of the start indicator and the stop indicator comprise one or more keywords and wherein one or more of the start location and the stop location are positioned within a predetermined distance of an occurrence of the one or more keywords in one or more of the first file and the second file.

9. The method of claim 1, wherein one or more of the start indicator and the stop indicator specify a plurality of keywords and one or more threshold distances between individual words of the plurality of keywords.

10. The method of claim 1, wherein one or more of the start indicator and the stop indicator specify a plurality of keywords and wherein determining a start location and determining a stop location comprises:
determining a keyword score for a section of one or more of the first file and the second file, the keyword score based on a number of words in the section matching keywords of the plurality of keywords;
determining that the keyword score meets a threshold; and
assigning a beginning of the section as the start location and assigning an end of the section as the stop location in response to determining that the keyword score meets the threshold.

11. The method of claim 1, further comprising displaying one or more of the first difference region and the second difference region prior to performing the difference analysis.

12. The method of claim 1, further comprising adjusting a size of one or more of the first difference region and the second difference region in response to external input.

13. The method of claim 1, further comprising outputting a difference result, the difference result indicating the differences between the first difference region and the second difference region.

14. An apparatus comprising:
a start determination module that determines a start location in each of a first file and a second file, the start location defined from a start indicator;
a stop determination module that determines a stop location in each of the first file and the second file, the stop location defined from a stop indicator;
a difference region module that defines a first difference region in the first file and a second difference region in the second file, the first and second difference regions comprising portions of the first and second files respectively, the portions being between the start location and the stop location in each of the first file and the second file; and
a difference analysis module that performs a difference analysis between the first difference region and the second difference region, the difference analysis comprising identifying differences between the first difference region of the first file and the second difference region of the second file, wherein content between the start location and stop location of each of the first file and the second file is unknown prior to performing the difference analysis.

15. The apparatus of claim 14, further comprising a server executing the start determination module, the stop determination module, the difference region module, and the difference analysis module, the server comprising a processor and a memory.

16. The apparatus of claim 14, wherein one or more of the start indicator and the stop indicator comprise one or more of:
a bookmark;
one or more keywords;
one or more function names;
one or more object names;
one or more Extended Markup Language (XML) tags;
one or more section names; and
one or more regular expressions.

17. The apparatus of claim 14, further comprising an output module that outputs a difference result, the difference result indicating differences between the first difference region and the second difference region.

18. A computer program product comprising a computer readable storage medium having computer readable program code embodied therewith, the computer readable program code for:
determining a start location in each of a first file and a second file, the start location defined from a start indicator;
determining a stop location in each of the first file and the second file, the stop location defined from a stop indicator;

defining a first difference region in the first file and a second difference region in the second file, the first and second difference regions comprising portions of the first and second files respectively, the portions being between the start location and the stop location in each of the first file and the second file; and performing a difference analysis between the first difference region and the second difference region, the difference analysis comprising identifying differences between the first difference region of the first file and the second difference region of the second file, wherein content between the start location and stop location of each of the first file and the second file is unknown prior to performing the difference analysis.

19. The computer program product of claim 18, wherein determining the start location in each of the first file and the second file further comprises searching each of the first file and the second file for a particular location in each of the first file and the second file, the particular location comprising the start indicator and determining that the particular location is the start location and wherein determining the stop location in each of the first file and the second file further comprises searching each of the first file and the second file for a second particular location in each of the first file and the second file, the second particular location comprising the stop indicator, the computer readable program code further for determining that the second particular location is the stop location.

20. The computer program product of claim 18, further comprising displaying one or more of the first difference region and the second difference region prior to performing the difference analysis.

\* \* \* \* \*